United States Patent [19]

Evans et al.

[11] Patent Number: 4,677,176
[45] Date of Patent: Jun. 30, 1987

[54] LIGHT COLOR, LOW SOFTENING POINT PETROLEUM HYDROCARBON RESINS

[75] Inventors: Morris L. Evans; Steven G. Hentges, both of Baton Rouge, La.

[73] Assignee: Exxon Chemical Patents Inc., Linden, N.J.

[21] Appl. No.: 830,409

[22] Filed: Feb. 18, 1986

[51] Int. Cl.$^4$ ............................................. C08F 36/04
[52] U.S. Cl. ..................................................... 526/290
[58] Field of Search ............... 526/290; 525/232, 236, 525/237

[56] References Cited

U.S. PATENT DOCUMENTS

| | | | |
|---|---|---|---|
| 3,574,792 | 4/1971 | Ayashi et al. | 260/894 |
| 3,661,870 | 5/1972 | Bullard | 260/80.7 |
| 3,692,756 | 9/1972 | St. Cyr | 260/80.7 |
| 3,804,788 | 4/1974 | Funaoka et al. | 260/70 R |
| 3,813,357 | 5/1974 | St. Cyr | 260/5 |
| 3,853,826 | 12/1974 | St. Cyr | 260/80.7 |
| 3,872,064 | 3/1975 | Pace et al. | 260/80.7 |
| 3,931,125 | 1/1976 | Katayama et al. | 260/82 |
| 3,963,653 | 6/1976 | Katayama et al. | 260/4 AR |
| 4,046,838 | 9/1977 | Feeney | 526/290 |
| 4,078,132 | 3/1978 | Lepert | 526/76 |
| 4,098,983 | 7/1978 | Osborn | 526/290 |
| 4,153,771 | 5/1979 | Bullard et al. | 526/221 |
| 4,391,961 | 7/1983 | Small et al. | 526/76 |
| 4,514,554 | 4/1985 | Hughes | 526/290 |

*Primary Examiner*—Paul R. Michl
*Attorney, Agent, or Firm*—J. F. Hunt

[57] ABSTRACT

A light color petroleum hydrocarbon resin including an aromatic hydrocarbon component useful for tackifying block copolymers is described which has a softening point of about 0° C. to about 40° C., a number average molecular weight (Mn) of from 350 to 600 and a molecular weight distribution (Mw/Mn) of from 1:1 to about 2.0.

14 Claims, No Drawings

LIGHT COLOR, LOW SOFTENING POINT PETROLEUM HYDROCARBON RESINS

This invention relates to a petroleum resin having excellent tackifying properties in adhesives. More particularly, it relates to a petroleum resin having aromatic components with light color and a softening point of about 0° C. to about 40° C.

BACKGROUND OF THE INVENTION

Adhesives form a large part of daily activity for everyone, whether in the form of tape used to close a package or secure items together, bandages, envelopes, notepads, diaper tabs or any one of many other products in common use. The key requirements for adhesives are that they should have suitable cohesive and adhesive properties at end use conditions and during application, whether by solvent or bulk casting. Usually these adhesives are prepared from a mixture of resin, copolymer and a plasticizer to soften the adhesive and enhance tack.

Adhesives prepared from blends incorporating these polymers have very good adhesive and strength properties at room temperature and can be processed by conventional melt coating and extrusion techniques because of their good flow characteristics. However, when copolymers are mixed with tackifying resins in order to form adhesives, many requirements and factors are important such as the ease with which the resin is blended with the copolymer and the control of the tack as well as the long term properties of the adhesive. Further, the adhesives industry has increased the demand for low softening point resins and market requirements dictate the desirability of resins which are not only liquid, i.e., softening point about 40° C. or less, but that are light in color, even a Gardner color of less than about 3. However, a resin would be considered to be sufficiently light in color for some applications with a Gardner color of 6 or even 7.

Many attempts have been made to prepare resins having these properties for use in the blending with copolymers to form adhesives, but all have fallen short of the mark in one respect or another. While other attempts have been made to prepare light color, low softening point resins such as those described in, for example, U.S. Pat. Nos. 3,963,653; 3,931,125; 3,574,792 and 4,078,132, most attempts have been centered around the preparation of aliphatic resins of the type described, for example, in U.S. Pat. Nos. 3,813,357; 3,692,756; 3,661,870; 3,804,788; 3,853,826; 3,872,064; 3,098,983 and 4,153,771. Unfortunately, aliphatic resins do not provide desired adhesive properties with many copolymers. Other components are required, usually an oil such as a naphthenic oil for example, to impart the tack or other requisite adhesive properties to the adhesive. The presence of the oil itself can cause detrimental adhesive performance. The liquid resins containing aromatic components solve these problems.

Prior attempts to incorporate aromaticity into the resin have generally caused an unacceptable high color level to result, thus making the resulting adhesive unsuitable for various uses.

Accordingly, it is an object of this invention to provide a low softening point hydrocarbon resin; i.e., from 0° C. to about 40° C.

It is a further object of this invention to provide a low softening point resin having a light color while including aromatic substituents to enhance adhesive properties.

SUMMARY OF THE INVENTION

We have discovered a light color, low softening point resin polymerized in a Friedel Crafts reaction from a feed stock comprising: (a) from about 5% to about 75% by weight of $C_8$ to $C_{10}$ vinyl aromatic hydrocarbon stream; (b) from about 10% to about 35% by weight of a piperylene concentrate stream; and (c) from about 25% to about 70% by weight of a stream containing $C_4$ to $C_8$ monoolefin chain transfer agents of the formula $RR'C=CHR''$ where R and R', individually, are $C_1$ to $C_5$ alkyl, R'' is H or a $C_1$ to $C_4$ alkyl group, in the presence of an aluminum chloride containing catalyst to produce a petroleum resin having a weight average molecular weight (Mw) of 110 to about 1600, a number average molecular weight (Mn) of 100 to 600, a (Mw)/(Mn) ratio of from 1.1 to about 2.7, and a softening point of from 0° C. to about 40' C. The resin can be blended with copolymers to provide useful adhesive compositions. The molecular weights are measured by a gel permeation chromatograph using a polyisobutylene standard and appear as mono-modal peaks on the chromatograph chart.

Thus, in accordance with this invention there is provided a petroleum hydrocarbon resin containing a major proportion of the aluminum chloride catalyzed polymerizate having a number average molecular weight (Mn) of from 100 to 600, a weight average molecular weight (Mw) of from about 110 to about 1600, a Mw/Mn ratio of 1.1 to 2.7 and a softening point ranging from 0° C. to 40° C. The color of the resins of this invention range from less than about 1 to about 7 on the well known Gardner scale even though the finished resin has a vinyl aromatic content of from about 10 weight percent to about 60 weight percent.

The resin of this invention is attractive and functional for use in adhesives since it has both a low softening point and light color in addition to good tack and high compatibility with ethylene vinyl acetate (28–40% vinyl acetate) and other copolymers, both block and random. Heretofore, such a resin was not available.

DETAILED DESCRIPTION OF THE INVENTION

In practicing this invention to produce the novel petroleum resins which have been found to provide tackification in many copolymer blends, the feedstock composition is important to obtain resins possessing requisite molecular weight and distribution, softening point and preferred color for a particular use. While the reaction conditions are also important, they may be varied somewhat.

The resin of this invention, having a softening point from 0° C. to about 40° C., and preferably from about 15° C. to about 30° C. and a color less than about a Gardner color of 7 (determined in a 50/50 solution with toluene) and preferably less than 5, most preferably a Gardner color less than about 2, is formed from a feed containing a $C_8$ to $C_{10}$ vinyl aromatic hydrocarbon stream, a heart cut distillate stream from steam cracked aromatic hydrocarbons having a boiling point range of from about 80° C. to about 260° C. or, preferably, pure styrene monomer, substituted styrene monomers, or mixtures thereof, present in amounts of from about 5% to about 75% by weight and preferably from about 5% to about 50% by weight of the polymerization feed.

Preferable ranges of the vinyl aromatic component depend largely upon the end use involved and the desired properties of the resins. As noted above, color depends, at least in part, on the purity of the aromatic stream. Thus, preferred applications where light color is needed dictate that fewer impurities be present in the vinyl aromatic hydrocarbon stream even though the impurities are also hydrocarbons which act as a diluent in the reaction mixture and are removed after the resin is formed. When a resin having a softening point of from 15° C. to about 30° C. and a Gardner color of about 2 or less is desired, the preferred range of the vinyl aromatic component in the finished resin would be from about 10 to about 60 weight percent. The vinyl aromatic monomer content of the feed to achieve this aromatic content in the resin is from about 5 to about 50 parts by weight in the feed.

Included as the second component is from about 10% to about 35% by weight, preferably from about 10% to about 26% and most preferably from about 12% to about 16% by weight, of a piperylene concentrate resulting from the isolation of a fraction of steam cracked petroleum hydrocarbons which boils between about 20° C. to about 140° C., said fraction containing diolefins being substantially below the nine carbon atom level. Preferably, piperylene concentrates have long been used in the preparation of resins along with the $C_5$ or $C_6$ olefins or diolefins, or mixtures thereof. Such fraction is heat soaked as is well known and described in U.S. Pat. No. 4,391,961, such disclosure being incorporated herein by reference for all purposes. The piperylene concentrate hereinafter sometimes referred to as heat soaked piperylenes, when incorporated into the resin of this invention, imparts a lower color to the resulting resin. While the piperylene concentrate can be used without heat soaking to produce the low softening point resin, a heat soaking step improves color. Piperylene concentrates, as will be shown later, contain hydrocarbons which do not enter into the resin-forming reaction. The presence of unreactive materials normally do no harm to the resin and, during reaction, act as a diluent to be removed when the resin is recovered.

The third component of the resin feed stream is a chain transfer agent comprising a stream containing $C_4$ to $C_8$ monoolefin chain transfer agents of the general formula $RR'C=CHR''$ where R and R' are $C_1$ to $C_5$ alkyl, and R'' is H or a $C_1$ to $C_4$ alkyl group. Useful chain transfer agents are, for example, isobutene, isoamylenes, isohexenes and diisobutenes. The isoamylenes particularly useful are described in U.S. Pat. No. 4,514,554, the disclosure of which is incorporated by reference herein for all purposes. These are usually concentrates, or mixtures, containing the various isomers desired from distillation cuts, well known to those skilled in the art, as well as mixtures made from pure compounds.

Particularly useful as the chain transfer agent to prepare the resin of the instant invention is the mixture containing isohexene isomers resulting from the dimerization or propylene in the well known "Dimersol" process using a nickel coordination complex and an aluminum alkyl as catalyst. The process can convert propylene to hexenes with selectivity in excess of 85%. The Dimersol ® dimerization process has been referred to in various publications, e.g., see "How First Dimersol is Working" by Benedek et al., Hydrocarbon Processing, May 1980, page 143; also Chauvin et al., "The IFP Dimersol ® Process for the Dimerization of $C_3$ and $C_4$ Olefinic Cuts", Advances in Petrochemical Technology, presented at American Institute of Chemical Engineers, Apr. 13, 1976, Kansas City, Mo.

While it is known that the pure compounds and isomers making up the aforementioned $C_4$ to $C_8$ monoolefin chain transfer agent streams are useful chain transfer agents, it is within the scope of the present invention to use mixtures of isomers, and reaction products containing such isomers, in the practice of this invention, with the isohexenes produced by the "Dimersol" dimerization process being preferred.

Hexenes, as produced by dimerization of propylene with transition metal catalyst, as in the Dimersol ® dimerization process, are characterized by being composed mainly of internal olefins, and a linear content which has a range from about 20% up to 32% or so by weight. The main isomer present is a 2-methyl-2-pentene, along with other 2- and 4-methyl pentenes and around 6% 2,3-dimethyl-2-butene. Some $C_9$ trimer, about 15% is also produced in the process. While it is not necessary to separate the $C_9$ trimer from the isohexene mix in the practice of this invention, it is preferred.

The chain transfer agent stream is present in the polymerization reaction mixture in an amount of from about 25% to about 70% by weight with 45% to about 65% by weight being preferred depending upon the properties finally desired.

In carrying out the polymerization reaction, the hydrocarbon mixture is brought into contact with a catalyst containing aluminum chloride, with anhydrous aluminum chloride being preferred. Generally, the catalyst is used in particulate form having a particle size in the range of from about 5 to about 200 mesh size, although larger or smaller particles can be used. The amount of catalyst used ranges from about 0.5% to about 2.0% by weight, preferably 1.0% to 2.0% by weight. The catalyst may be added to the hydrocarbon mixture or the hydrocarbon mixture may be added to the catalyst. The reaction can be conducted continuously or by batch process techniques generally known to those skilled in the art.

The reaction should also be carried out at a pressure of from 10 psi (0.7 Kg/cm$^2$) to 80 psi (56 Kg/cm$^2$), preferably 20 (1.4 Kg/cm$^2$), psi. The temperature of reaction ranges from about 20° C. to 100° C., more usefully from 30° C. to 60° C., and most preferably from about 35° C. to about 50° C. The time of polymerization ranges from one-fourth to 2.0 hours, preferable from 20 minutes to 1 hour.

The reaction is conveniently carried out in the presence of a diluent because the reaction is usually exothermic and the resulting product is viscous. However, with adequate mixing and cooling, the temperature can be controlled and reaction conducted with only sufficient diluent to maintain good heat transfer for the heat of polymerization. The diluent may be introduced as an integral component of the feedstock streams when concentrates, reaction mixtures or distillation fractions are used, but various other diluents which are inert in that they do not enter into the polymerization reaction, may be separately added. Representative examples of inert diluents are aliphatic hydrocarbons such as pentane, hexane and heptane, aromatic hydrocarbons such a xylene, toluene and benzene, and unreacted residual hydrocarbons from the reaction may be useful as diluents.

After the polymerization is complete, the catalyst is quenched by well known means, usually by adding water and alcohol solution followed by resin recovery which involves stripping of unreacted hydrocarbons, including diluent from the resin as known by those skilled in preparing such resins. This "finishing" step is usually carried out by heating, in a nitrogen environment, usually to about 250° C., followed by steam stripping to remove unreacted material and low molecular weight oligomers ("fill"). The degree of stripping can be varied somewhat as desired to make small adjustments to the softening point.

The raffinate removed can be saved and used as the diluent for other polymerization reactions to form resins.

The resin obtained by the above-identified polymerization process using the feedstock herein described can have a wide variety of properties within the scope of the aforesaid parameters (they will still have light color and a low softening point between 0° C. and 40° C.) by varying feedstock selection. For example, if a Gardner color of 6 to 8 can be tolerated, then (1) the vinyl aromatic feed stream can be derived from a distillation cut boiling in the range of from about 80° C. to about 260° C. from a steam cracked aromatic hydrocarbon stream; and (2) a piperylene concentrate ($C_5$ olefin and diolefin mixture) which is not heat soaked can be used. If slightly better color, i.e., Gardner 3 to 6 is desired, then a styrene concentrate, i.e., a distillation stream containing predominantly styrene and its various substituted styrene materials such as alpha-methylstyrene, para-methylstyrene or vinyl-toluenes may be used. Finally, if Gardner color less than 3 is desired, then it is preferred to use pure styrene or substituted styrene monomers, with styrene, alpha-methylstyrene or mixtures thereof being preferred. When these monomers or mixtures of pure monomers are used with a heat soaked piperylene concentrate, a preferred resin having a color of 2 or less on the Gardner scale, a molecular weight distribution of from 1.15 to 1.25 and a softening point of from 15° C. to 30° C. can be obtained. These are superior resins for use in adhesives. The resins of this invention can be readily blended with copolymers using well known methods to form adhesives and find great use as such.

The resins of this invention can be readily prepared from the foregoing description and the following examples. Those skilled in preparing adhesives from petroleum hydrocarbon resins will be able to incorporate same with copolymers. Accordingly, this invention is further described by the following examples which are offered by way of explanation and for the purposes of guiding those skilled in the art to the practice of this invention and the broadening of its usefulness and not for purposes of limitation thereof and it should not be so construed.

EXAMPLES 1–4

The liquid resins of Examples 1–4 were polymerized batchwise using aluminum chloride catalyst in a nitrogen atmosphere at about 12 psig (0.84 Kg/cm$^2$). The aluminum chloride catalyst (having particle size between 5 and about 200 mesh) is added in anhydrous form. In these polymerizations, 400 grams of feed blend, in proportions indicated in Table 1, were pumped into a closed, stirred reactor containing catalyst, over a thirty minute period of time and then left in contact with the catalyst for an additional thirty minutes with stirring. A 400 gram 1:3 solution of isopropanol:water was added to the reaction mixture to quench the catalyst and the polymerizate was water washed two to three additional times with the aqueous phase being separated after each wash.

The polymerizate was finished by heating to 250° C. in a nitrogen atmosphere to remove unreacted material. The polymerizate was then steam stripped at 250° C. to produce the finished resin.

In Examples 1–4, the xylenes, styrene, p-methylstyrene, mixed methyl styrenes and alpha-methylstyrene components were of at least 96% purity. The compositions of the heat soaked piperylene concentrate and isoamylene concentrate used are shown below:

|  | Piperylene Concentrate | Isoamylene Concentrate |
|---|---|---|
| Pentene-1 | 1.8 | 33.6 |
| Pentene-2[1] | 8.7 | 26.3 |
| 2 Methylbutene-1 | 0.1 | 29.6 |
| 2 Methylbutene-2 | 3.2 | 3.3 |
| Cyclopentene | 12.2 | — |
| Pentadiene-1,3[1] | 19.9 | — |
| Low reactivity olefins and nonreactive paraffins | 54.1 | 7.2 |

[1]cis and trans isomers

These examples show the influence of aromatic olefin structure on resin properties. Resin properties are shown in Table 1 below:

TABLE 1

| Example | 1 | 2 | 3 | 4 |
|---|---|---|---|---|
| Feed Composition (part by weight) | | | | |
| Isoamylene Concentrate | 50 | → | → | → |
| Piperylene Concentrate | 21.4 | → | → | → |
| Styrene | 28.6 | — | — | — |
| P—Methylstyrene | — | 28.6 | — | — |
| Mixed Methylstyrenes Meta-60% Para-40% | — | — | 28.6 | — |
| Alpha-Methylstyrene | — | — | — | 28.6 |
| Xylenes | 42.9 | → | → | → |
| Polymerization | | | | |
| Catalyst, wt % | 1.4 | → | → | → |
| Reactor Temperature, °C. | 45 | → | → | → |
| Reactor Pressure, psig | 12 | → | → | → |
| Resin Finishing | | | | |
| Resin Yield, wt % | 37.1 | 37.6 | 38.5 | 22.6 |
| Resin Properties | | | | |
| Softening Point, °C. | 21 | 36 | 22.5 | 15 |
| Cloud Point, °C. 20/40/40 (a) | <70 | → | → | → |
| Gardner Color (b) | 3.5 | 3.5 | 4.5 | 6.5 |
| GPC Molecular Weight | | | | |
| Mn | 135 | 197 | 142 | 125 |
| Mw | 210 | 403 | 232 | 195 |
| Mw/Mn | 1.56 | 2.05 | 1.63 | 1.56 |

(a) The temperature at which there is an appearance of haze or "cloud" in a mix of 40 parts 60° C. melt point paraffin wax, 20 parts of Escorene ® 7750 (ethylene vinylacetate, 28% vinylacetate) from Exxon Chemical Company and 40 parts test resin heated to 200° C. and allowed to cool in air with stirring.
(b) 50 wt % resin solution in toluene with comparator discs.

The ring and ball softening points of the resins were determined using a modified ASTM E-28 procedure. The softening point was measured in a 50/50 ethylene glycol/water solution. The rings were kept in a −25° to −30° C. environment until the ethylene glycol/water solution was cooled to that temperature range. The ring and ball softening point apparatus was assembled and heated at 5° C./min. The softening point temperature was then read according to the ASTM E-28 procedure.

EXAMPLES 5-13

In Examples 5-13, a styrene concentrate fraction of steam cracked naphtha boiling within the range of from 80° C. to 190° C. was used with the isoamylene and piperylene concentrate to prepare resins in the manner described in Examples 1-4 above in proportions as set forth in Table 3. The compositions of the styrene concentrates are shown in Table 2 below:

TABLE 2

COMPOSITION OF STYRENE CONCENTRATES

| Component | I | II | III |
|---|---|---|---|
| Ethyl Benzene | 4.6 | 2.6 | 6.5 |
| O, M, P—Xylene | 30.3 | 24.8 | 40.5 |
| Styrene | 28.8 | 26.5 | 33.6 |
| Alpha-Methylstyrene | 3.0 | 4.3 | 1.2 |
| Vinyl Toluenes | 5.1 | 7.6 | 1.5 |
| Other Alkyl substituted Benzenes | 28.2 | 34.2 | 16.7 |

These resins were polymerized and finished, and the softening points were determined using the same procedures discussed in Examples 1-4. These examples show the effect of varying feed blend ratios on resin properties. Note the high color and softening points of certain resins derived from the styrene concentrates.

Examples 10, 12 and 13 show the effect of styrene concentrate composition on resin properties.

in place of isoamylene concentrate in resins produced as described in Examples 1-4 above. Typical compositions of the $C_6$ olefin stream and the piperylene concentrate used in these examples follow:

| Typical Composition of Mixed $C_6$ Olefin Stream, %* | |
|---|---|
| 2-Methyl-1-Pentene | 3.9 |
| 2-Methyl-2-Pentene | 25.9 |
| 2,3-Dimethyl-1-Butene | 2.8 |
| 2,3-Dimethyl-2-Butene | 2.7 |
| Other $C_6$ Olefins | 50.5 |
| $C_9$ Olefins | 14.2 |

| Typical Composition of Heat Soaked Piperylene Concentrate, % | |
|---|---|
| 1-Pentene | 2.5 |
| Cis and trans-2-Pentene | 6.5 |
| 2-Methyl-1-Butene | 0.2 |
| 2-Methyl-2-Butene | 3.7 |
| Cyclopentene | 17.4 |
| Cis and trans-Piperylene | 28.8 |
| Low reactivity olefins and nonreactive paraffins | 40.9 |

*"Dimate", from Diamond Shamrock, produced by dimerization of propylene.

In these Examples, pure styrene and alpha-methylstyrene monomers were used as the vinyl aromatic hydrocarbon stream resulting in resins having an aromatic content from about 10 weight percent to about 60 weight percent and a Gardner color of about 1. The feedstock composition and resin properties are shown in Table 4 below.

TABLE 3

| Example | 5 | 6 | 7 | 8 | 9 | 10 | 11 | 12 | 13 |
|---|---|---|---|---|---|---|---|---|---|
| Feed Composition, parts by weight | | | | | | | | | |
| Isoamylene Concentrate | 35 | 20 | 15 | — | 70 | 55 | 40 | 55 | 55 |
| Piperylene Concentrate | 15 | 30 | 15 | 30 | — | 15 | 30 | 15 | 15 |
| Styrene Concentrate I | 50 | 50 | 70 | 70 | 30 | 30 | 30 | — | — |
| Styrene Concentrate II | — | — | — | — | — | — | — | 30 | — |
| Styrene Concentrate III | — | — | — | — | — | — | — | — | 30 |
| Polymerization | | | | | | | | | |
| Catalyst, wt % | 1.4 | 2.0 | 2.0 | 1.4 | 1.4 | 2.0 | 1.4 | 1.4 | 1.0 |
| Reactor Temperature °C. | 45 | → | → | → | → | → | → | → | → |
| Reactor Pressure, psig | 12 | → | → | → | → | → | → | → | → |
| Resin Finishing | | | | | | | | | |
| Resin Yield wt % | 29.1 | 31.2 | 33.2 | 29.8 | 13.6 | 21.4 | 24.8 | 29.3 | 29.5 |
| Resin Properties | | | | | | | | | |
| Softening Point, °C. | 38 | 50 | 50 | 64 | 20 | 29 | 40 | 21 | 13 |
| Gardner Color | 10 | 10.5 | 11.5 | 11 | 12 | 10.5 | 8.5 | 10 | 6 |
| GPC Molecular Weight | | | | | | | | | |
| Mn | 175 | 167 | 141 | 156 | 194 | 183 | 200 | 304 | 280 |
| Mw | 344 | 349 | 361 | 419 | 287 | 333 | 304 | 432 | 372 |
| Mw/Mn | 1.97 | 2.09 | 2.56 | 2.69 | 1.48 | 1.82 | 1.52 | 1.42 | 1.33 |

EXAMPLES 14-20

In Examples 14-20, a mixed $C_6$ monoolefin stream prepared from the dimerization of propylene was used

TABLE 4

| Example | 14 | 15 | 16 | 17 | 18 | 19 | 20 |
|---|---|---|---|---|---|---|---|
| Feed Composition, Parts by wt. | | | | | | | |
| $C_6$ Olefins ("Dimate") | 69.4 | 36.5 | 59.5 | 59.5 | 50.8 | 66 | 43.9 |
| Piperylene Concentrate (1) | 25.2 | 13.7 | 22.5 | 22.5 | 19 | 24 | 16.4 |
| Styrene | 3.6 | 32.6 | 12 | 18 | 25.4 | 6.7 | 32.9 |
| Alpha-Methylstyrene | 1.8 | 17.1 | 6 | — | 4.8 | 3.3 | 6.8 |

TABLE 4-continued

| Example | 14 | 15 | 16 | 17 | 18 | 19 | 20 |
|---|---|---|---|---|---|---|---|
| Paraffinic Diluent | — | 46.2 | 49.2 | — | 58.7 | — | 37.0 |
| Polymerization | | | | | | | |
| Catalyst, wt % | 1.2 | 1.2 | 1.2 | 1.2 | 1.2 | 1.2 | 1.5 |
| Reactor Temperature, °C. | 40 | 40 | 40 | 40 | 40 | 40 | 40 |
| Reactor Pressure, psig | 10 | 10 | 10 | 10 | 10 | 10 | 10 |
| Resin Finishing | | | | | | | |
| Resin Yield, wt % | 24 | 50 | 30 | 37 | 36 | 28.3 | 46.3 |
| Fill, wt % | 1 | — | 4 | 4 | 4 | 7.1 | 4.3 |
| Resin Properties | | | | | | | |
| Softening Point, °C. | 20 | 21 | 17 | 23.5 | 24 | 23.5 | 29 |
| Cloud Point, °C. | 66 | 65 | 65 | 65 | 69 | 65 | 65 |
| Gardner Color | 1+ | 1+ | 1+ | 1+ | 1+ | 1− | 1− |
| Vinyl Aromatic Content, wt % | 12 | 59 | 34 | — | 45 | 25 | 51 |
| GPC Molecular Weight | | | | | | | |
| Mn | 426 | 362 | 445 | 396 | 472 | 399 | 406 |
| Mw | 521 | 443 | 522 | 453 | 578 | 467 | 499 |
| Mw/Mn | 1.22 | 1.22 | 1.17 | 1.14 | 1.22 | 1.17 | 1.23 |

(1) Heat soaked

EXAMPLES 21-23

In Examples 21-23, a heart cut distillate (80° C. to 260° C.) derived from steam cracked naphtha was used in place of the pure vinyl aromatic monomers in resins produced as described in Examples 1-4 above. A typical composition of this heart cut distillate is shown below.

| Typical Composition of Heart Cut Distillates; wt % | |
|---|---|
| Styrene | 7.2 |
| Vinyl Toluenes | 13.9 |
| Alpha-Methyl styrene | 3.8 |
| Beta-Methyl styrene | 3.1 |
| Indene | 12.1 |
| Non reactive Aromatics and Alkyl substituted Aromatics | 59.9 |

The feedstock compositions and resin properties are shown in Table 5 below:

TABLE 5

| Example | 21 | 22 | 23 |
|---|---|---|---|
| Feed Composition (parts by weight) | | | |
| C6 Olefins | 55 | 45 | 58.8 |
| Piperylene Concentrate (1) | 15 | 10 | 23.5 |
| Heart Cut Distillate | 30 | 45 | 17.6 |
| Polymerization | | | |
| Catalyst, wt % | 1.4 | 1.4 | 1.2 |
| Reactor Temperature, °C. | 40 | 40 | 40 |
| Reactor Pressure, psig | 10 | 10 | 10 |
| Resin Finishing | | | |
| Resin Yield, wt % | 40.7 | 46.6 | 29.6 |
| Fill, wt % | — | — | 7.6 |
| Resin Properties | | | |
| Softening Point, °C. | 23 | 26 | 21 |
| Cloud Point, °C. | 66 | 65 | 65 |
| Gardner Color | 6+ | 7 | 4+ |
| Vinyl Aromatic Content, wt % | 37 | 49 | 22 |
| GPC Molecular Weight | | | |
| Mn | 504 | 428 | 423 |
| Mw | 705 | 571 | 518 |
| Mw/Mn | 1.40 | 1.35 | 1.22 |

(1) Heat Soaked

Better color (i.e., a lower Gardner number) could be achieved in the above formulation if the heart cut distillate were acid treated using known methods.

EXAMPLES 24 AND 25

In the manner described in Examples 1-4, Examples 24 and 25 demonstrate the use of diisobutene and an isoamylene concentrate to prepare resins within the scope of the invention. The resin of Example 24 was stripped excessively, resulting in a softening point of 41° C. If excessive stripping had not occurred, the softening point would have been 40° C. or less with a Gardner color of about 2 also resulting. The results of these experiments are shown in Table 6:

TABLE 6

| Example | 24 | 25 |
|---|---|---|
| Feed Composition, Parts by wt. | | |
| Styrene | 16.3 | 12.0 |
| Alpha-Methylstyrene | 8.2 | 6.0 |
| Heat Soaked piperylenes | 30.6 | 22.5 |
| Diisobutene | 44.9 | — |
| Isoamylene | — | 59.5 |
| Diluent | 104.1 | 27.2 |
| Polymerization | | |
| Catalyst, wt % | 1.2 | 1.2 |
| Reactor Temperature, °C. | 40 | 40 |
| Reactor Pressure, psig | 10 | 10 |
| Resin Finishing | | |
| Resin Yield, wt % | 27.4 | 44.3 |
| Fill, wt % | 12.0 | — |
| Resin Properties | | |
| Softening Point, °C. | 41 | 10 |
| Cloud Point, °C. | 65 | 65 |
| Gardner Color | 4+ | 1 |
| Resin Molecular Weight, GPC | | |
| Mn | 519 | 356 |
| Mw | 619 | 400 |
| Mw/Mn | 1.19 | 1.12 |

The foregoing disclosure and description of the invention are illustrative and explanatory thereof, and various changes in the size, shape and materials, as well as in the details of the illustrated construction may be made without departing from the spirit of the invention.

What is claimed is:

1. A petroleum hydrocarbon resin, suitable for use as a tackifier in an adhesive composition, having a softening point of from 0° C. to about 40° C., a Gardner color of about 7 or less, and a number average molecular weight (Mn) of from about 100 to about 600, prepared by aluminum chloride-catalyzed Friedel Crafts polymerization of a hydrocarbon feed comprising:
(a) from about 5% to about 75% by weight of a $C_8$ to $C_{10}$ vinyl aromatic hydrocarbon stream;
(b) from about 10% to about 35% by weight of a piperylene stream; and
(c) from about 25% to about 70% by weight of a stream containing $C_4$ to $C_8$ monoolefin chain transfer agent of the formula $RR'C=CHR''$ where R and R' are $C_1$ to $C_5$ alkyl, R'' is H or a $C_1$ to $C_4$ alkyl group.

2. The resin of claim 1 wherein the $C_8$ to $C_{10}$ vinyl aromatic hydrocarbon stream is a distillate fraction from steam cracked aromatic hydrocarbon having a boiling point range of from about 80° C. to about 260° C.

3. The resin of claim 1 wherein the piperylene stream is present in the hydrocarbon feed in amounts of from about 10% to about 26% by weight.

4. The resin of claim 3 wherein the piperylene stream is a heat soaked piperylene.

5. The resin of claim 1 wherein the chain transfer agent stream is present in amounts of from about 45% to about 65% by weight.

6. The resin of claim 1 wherein the chain transfer agent stream is a mixture of $C_6$ isomers produced by the dimerization of propylene.

7. The resin of claim 1 wherein the hydrocarbon feed comprises:
(a) from about 5 to about 50 parts by weight of styrene, alpha-methyl styrene or mixtures thereof;
(b) from about 10 to about 26 parts by weight of a heat soaked piperylene stream; and
(c) from about 25 to about 70 parts by weight of a mixed $C_6$ olefin stream produced by dimerization of propylene.

8. A petroleum hydrocarbon resin; having a softening point of from 10° C. to about 30° C., a Gardner color of 2 or less and a molecular weight distribution of from about 1.1 to about 1.3 with number average molecular weight of from about 350 to about 500; prepared by an aluminum chloride catalyzed Friedel Crafts polymerization from a reaction mixture comprising:
(a) from about 5 to about 50 parts by weight of styrene, alpha-methyl styrene or mixtures thereof;
(b) from about 10 to about 26 parts by weight of a heat soaked piperylene concentrate; and
(c) from about 25 to about 70 parts by weight of a stream containing mixed $C_6$ monoolefins resulting from the dimerization of propylene.

9. The resins of claim 8 wherein the reaction mixture includes a mixture of styrene and alpha-methyl styrene monomers.

10. A petroleum hydrocarbon resin consisting essentially of a heat soaked piperylene component, a chain transfer agent component and a vinyl aromatic component of substantially pure styrene or substituted styrene monomer or mixtures thereof wherein said resin has a color of about a Gardner 2 or less, a softening point of from 15° C. to about 30° C. and a molecular weight distribution of from 1.15 to about 1.25.

11. The resin of claim 10 wherein the vinyl aromatic component is from about 10 weight percent to about 60 weight percent of the resin.

12. The resin of claim 11 having a Gardner color of about 1.

13. The petroleum hydrocarbon resin of claim 1 wherein said hydrocarbon feed consists essentially of the three components (a), (b), and (c).

14. The petroleum hydrocarbon resin of claim 8 wherein said reaction mixture consists essentially of the three reaction components (a), (b), and (c).

* * * * *